United States Patent [19]

Brinegar et al.

[11] 4,218,706
[45] Aug. 19, 1980

[54] VIDEO CLAMP

[75] Inventors: Bill W. Brinegar, Garland, Tex.; John W. Haines, Tempe, Ariz.

[73] Assignee: Rockwell International Corporation, El Segundo, Calif.

[21] Appl. No.: 955,670

[22] Filed: Oct. 27, 1978

[51] Int. Cl.$^2$ .............................................. H04N 5/18
[52] U.S. Cl. ................................................... 358/172
[58] Field of Search ............... 358/160, 167, 171, 172, 358/173

[56] References Cited

U.S. PATENT DOCUMENTS

| | | | |
|---|---|---|---|
| 3,207,998 | 9/1965 | Corney et al. | 358/172 |
| 3,845,326 | 10/1974 | Godden | 358/172 |
| 4,114,179 | 9/1978 | Ilieve | 358/172 |

Primary Examiner—Richard Murray
Attorney, Agent, or Firm—H. Fredrick Hamann; Howard R. Greenberg; Richard K. Robinson

[57] ABSTRACT

A clamp circuit that reduces low frequency noise on a wideband signal such as a video signal by more than 50 dB is disclosed and includes an input amplifier for obtaining a difference signal that is the algebraic summation between an input signal having periodically spaced synchronization pulses and a reference signal. The reference signal is generated by sampled data techniques and includes a means for removing the synchronization pulses from the signal. After passing the synchronization pulse through a pulse shaper, they are used to operate a sample and hold device which samples the output of the difference amplifier during the synchronization periods and the sampled output, after being passed through a low-pass filter, is used as the reference signal to the difference amplifier which subtracts the reference signal from the wideband signal. An additional amount of low frequency rejection is provided by passing the difference signal through a switching clamp circuit.

10 Claims, 18 Drawing Figures

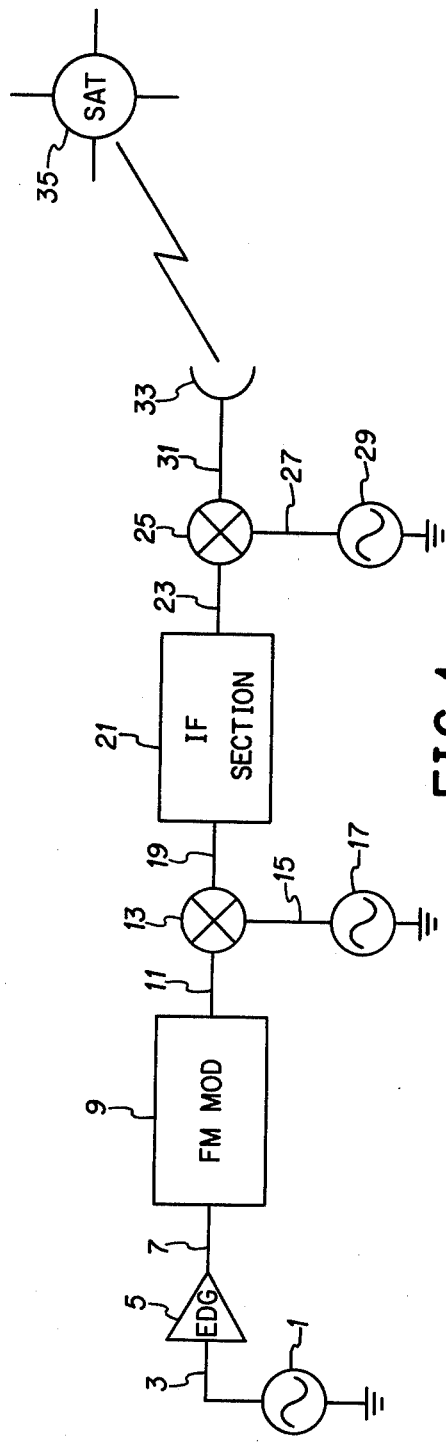
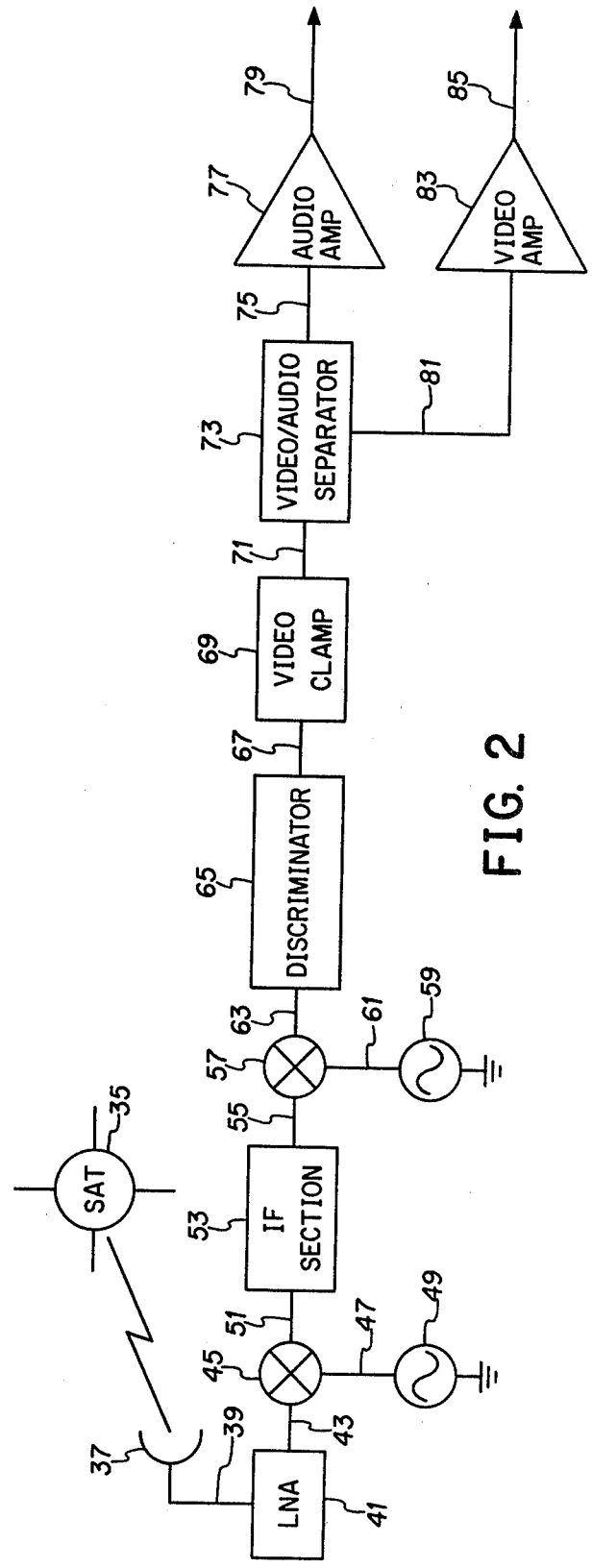
FIG. 1
FIG. 2

VIDEO CLAMP

BACKGROUND OF THE INVENTION

The invention relates to a method and apparatus for providing a video clamp having more than 50 dB low frequency noise rejection.

One of the major problems connected with the transmission of a television signal is the exceptionally wide video band of frequencies involved. In the transmission of the television signals of video frequency, the problem is further complicated because the lower limit of the frequency range extends literally to zero frequency. Therefore, to provide low frequency noise rejections, video clamps are added to the television receiver which should remove under ideal conditions the low frequency noise without degradation of the video signal.

In general, a video clamp is used to remove deviations of a designated portion of a video signal, such as blanking level or synchronization tip level from an arbitrary reference level. In an article published in 1950, Vol. 69 by the AIEE Transactions, there were described several video clamps and their applications. Among these are low frequency compensation circuits, DC restorer circuit, diode clamp type circuits, series capacitor clamper circuits and feedback clamper circuit, as well as other configurations. Although this article does not use the present day semi-conductor capabilities, it does provide an overview of the basic circuit arrangements that are used in the theory and application of clamp circuits.

In a present day video transmission system, which may even include a satellite relay station as shown in FIGS. 1 and 2, there is an additional low frequency noise purposely introduced in the transmission of video signals which is used to prevent a high concentration of energy around the carrier frequency. This requirement is not only to prevent the undesirable consequence of having a high concentration of energy around the carrier frequency, but it is also a requirement of the Federal Communications Commission's specification.

For an understanding of the operation of a satellite communications system as well as the technique used to prevent a high concentration of energy at the carrier frequency, reference should be made to FIG. 1 in which there is a source of the video signal 1 that can be a device such as a video camera or tape player. The output of the source of the video signal is provided on conductor 3 which connects the composite video signal generated by source 1 to the energy dispersal generator (EDG) 5. The energy dispersal generator (EDG) 5 provides a 30 hertz triangular waveform, which is summed with the composite video signal and is present on the output of the energy dispersal generator that is connected to conductor 7. The 30 hertz dispersal signal will spread the energy at carrier frequency over a wideband thus avoiding a peak concentration of energy at the carrier frequency. The output of the energy dispersal generator is applied to the FM modulator 9.

The output of the FM modulator is placed on conductor 11 for upconversion by mixing the signal present on conductor 11 with a local oscillator signal. The mixing process is accomplished by the apparatus that includes a mixer means 13 which is connected to an oscillator 17 by means of a conductor 15. The output of the mixer means 13 is provided on conductor 19. At this point, the frequency modulated composite video signal has been upconverted by being mixed with a 1170 megahertz source provided by oscillator 17. The output of the mixer means 13 is connected to the intermediate frequency (IF) section 21 by conductor 19.

The intermediate frequency section provides a 1100 megahertz signal on conductor 23 which again is passed through another mixer stage 25 where it is mixed with the local oscillator 29 which is connected to mixer means 25 by means of conductor 27. The output of the mixer 25 upconverts the 1100 megahertz signal to a frequency that can be between 5 and 6 gigahertz for transmission by antenna 33, which is connected to the mixer means 25 by conductor 31, to a satellite repeater station 35. The signal that the satellite repeater station 35 receives is a 5 to 6 gigahertz signal modulated with a composite video and audio components which have a bandwidth from 0 up to $\approx 4.5$ megahertz.

In addition to the energy dispersal input noise, there is also a possibility that the signal is imposed upon a low frequency waveform that occurs when the picture goes from a dark background picture to a light background and back to a dark background. This low frequency noise is generally referred to as "bounce" and has a frequency of around 10 hertz. In addition to the bounce and energy dispersal noise, there is also the ever present sixty hertz noise on the signal.

The satellite repeater station as shown in FIG. 2 retransmits the signal to a receiving antanna 37. It is applied to a low noise amplifier (LNA) 41 by means of conductor 39. The low noise amplifier 41 provides the noise figure for the signal that is provided on conductor 43 which connects it to mixer means 45. Mixer means 45 downconverts the received signal from a 4 gigahertz signal which is the frequency range of transmitted information from the satellite repeater station 35 to around 1100 megahertz. Downconversion is accomplished by local oscillator 49 which is connected to mixer 45 by means of conductor 47. The downconverted signal is present on conductor 51 and is applied to the first intermediate frequency (IF) stage, the output of which is downconverted again by mixer means 57 which mixes a local oscillator signal generated by local oscillator 59 and connected to mixer means 57 by means of conductor 61. The mixing frequency is normally around 1170 megahertz so that the output frequency on conductor 63 is 70 megahertz. Conductor 63 connects the 70 megahertz signal to discriminator 65 which provides the composite video signal upon conductor 67. At this stage, there is present a composite video signal that is superimposed upon a noise signal that is a composite signal having the thirty cycle triangular waveform plus sixty cycle noise as well as the possible "bounce" noise. This is applied to the video clamp 69 which must be able to remove all of the enumerated noise signal from the composite video. The output of the video clamp is present on conductor 71 which connects the composite video signal to a (video/audio) separator 73 that normally includes different filters. The audio at this point is removed and is present on conductor 75 and connected to audio amplifier 77, the output on conductor 79 is the audio signal and the video is present upon conductor 81 which is connected to video amplifier 83 and the output is provided upon conductor 85 for processing by the video section of the receiver.

It is obvious from the above discussion that the video clamp 69 of FIG. 2 must have very high low frequency noise rejection. It has been found that with the receiver shown in FIG. 2 that the video clamp must have a minimum of 50 dB low frequency noise rejection. The prior art video clamps were not able in practice to achieve this noise rejection.

A clamp circuit that reduces low frequency noise on a wide-band signal such as a video signal by more than 50 dB is disclosed and includes an input amplifier for obtaining a difference signal that is the algebraic summation between an input signal having periodically spaced synchronization pulses and a reference signal. The reference signal is generated by sampled data techniques and includes a means for removing the synchronization pulses from the signal. After passing the synchronization pulse through a pulse shaper, they are used to operate a sample and hold device which samples the output of the difference amplifier during the synchronization periods and the sampled output, after being passed through a low-pass filter, is used as the reference signal to the difference amplifier which subtracts the reference signal from the wide-band signal. An additional amount of low frequency rejection is provided by passing the difference signal through a switching clamp circuit.

In addition, there is shown a real time sync separator for removing the sync pulses from the received video signal, as well as a regenerated pulse generator and shaper.

The switching circuit for the sample and hold circuit is a diode bridge that is provided in detail with the associated circuitry.

Many other objects and purposes of the invention will be clear from the following detailed descriptions of the drawings.

BRIEF DESCRIPTION OF THE DRAWINGS

FIG. 1 is a block diagram of a composite video transmitter that has an energy dispersal circuit present;

FIG. 2 is a block diagram of a composite video receiver that has included therein a video clamp having more than 50 dB low frequency noise rejection;

DETAILED DESCRIPTION OF THE DRAWINGS

Figure 3:
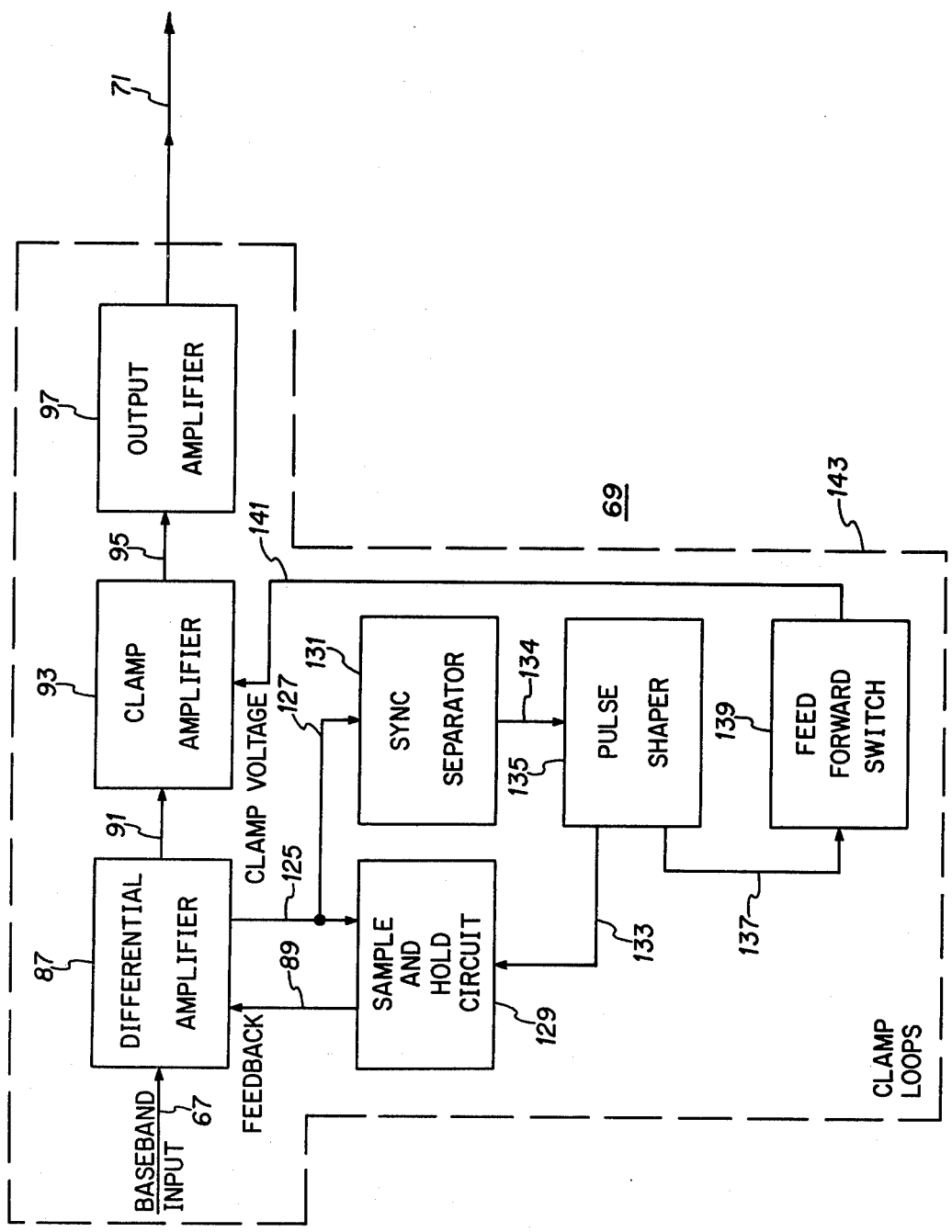
FIG. 3 is a simplified block diagram of the video clamp of FIG. 1.

Referring to FIG. 3 there is shown a block diagram of the video clamp 69 of the receiver of FIG. 2. The baseband video signal is conducted by conductor 67 to difference amplifier 87 which subtracts from the baseband video signal, a feedback signal that is present on conductor 89, the difference of which appears on conductor 91 and conductor 125. Conductor 91 connects the output of the difference amplifier into the clamp amplifier which periodically will clamp the video signal to a reference level.

Tracing the circuitry that controls the clamp amplifier 93 and the difference amplifier 87, the difference signal that is present on conductor 125 is carried to the sample and hold circuit 129 and also to the sync separator which is joined to conductor 125 by conductor 127. The sync separator removes the periodically placed sync pulses that are present on the baseband video signal and passes them to the pulse shaper 135 by means of conductor 134. The pulse shaper shapes the pulses into command pulses which are used to drive the switch drivers (not shown in FIG. 3). The first switch driver is connected to the sample and hold circuit 129 by means of conductor 133 and upon the occurrence of each pulse that was stripped off of the composite video signal, the sample and hold circuit will sample the voltage that is present on conductor 125 and hold that level on conductor 89. In addition, the pulse shaper also provides a signal on conductor 137 to the feed forward switch 139 which will clamp the signal present in the clamp amplifier 93 to an established reference level. The feed forward switch is connected to the clamp amplifier by means of conductor 141.

After the composite video signal has passed through the clamp amplifier, it has had removed most of the low frequency noise that was present on the video signal, such as the thirty cycle triangular waveform, sixty cycle noise and "bounce" noise. The composite output is present on conductor 95 and it is carried to the output amplifier 97 where it is amplified and the output is provided on conductor 71.

Figure 4:
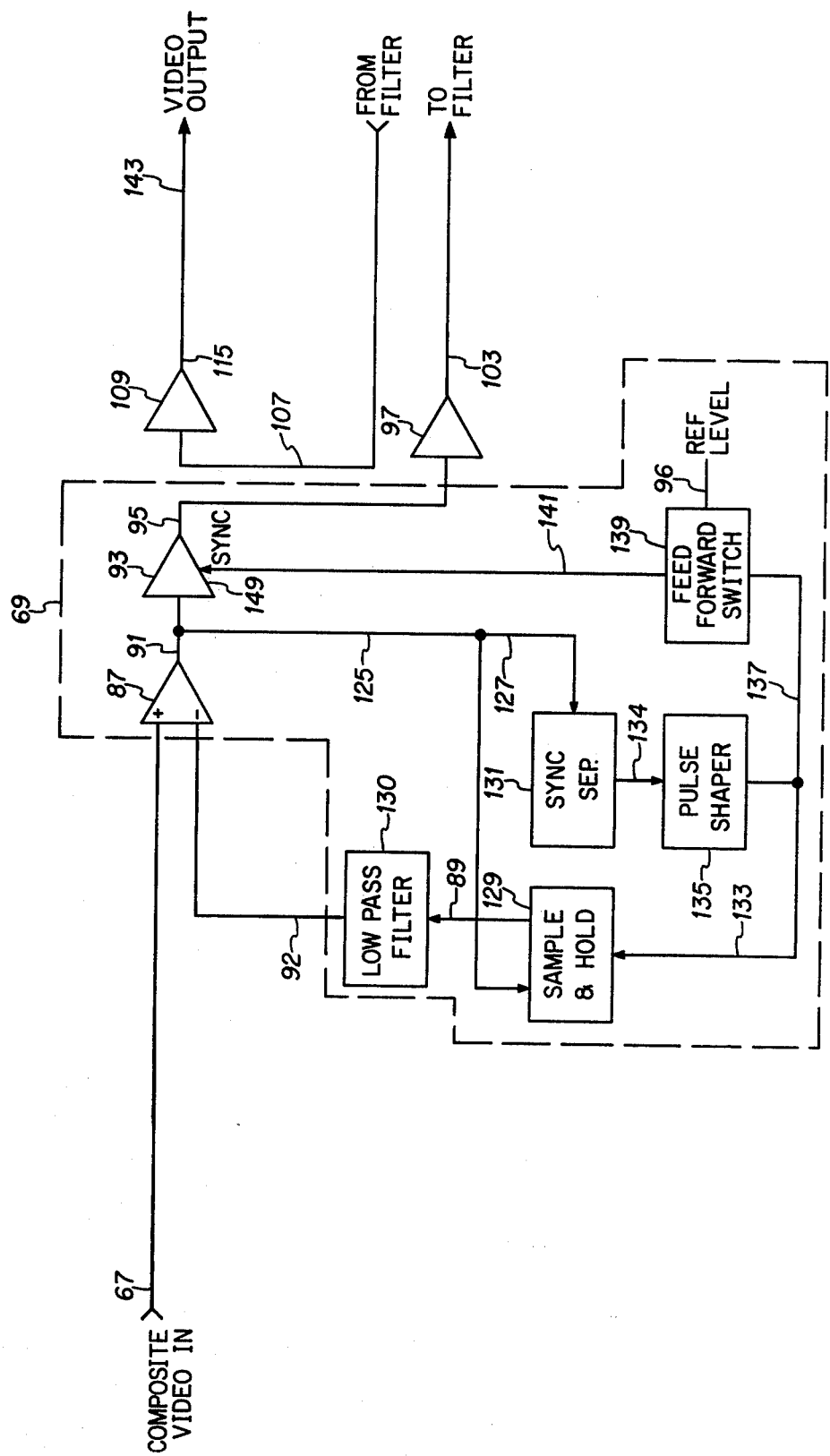
FIG. 4 is a block diagram of a video clamp according to the teachings of this invention.

In FIG. 4, which is a more detailed block diagram of the embodiment of FIG. 3 and when used in conjunction with the waveforms of FIGS. 5a through 5i, the inventon may be more readily understood.

Figure 5:
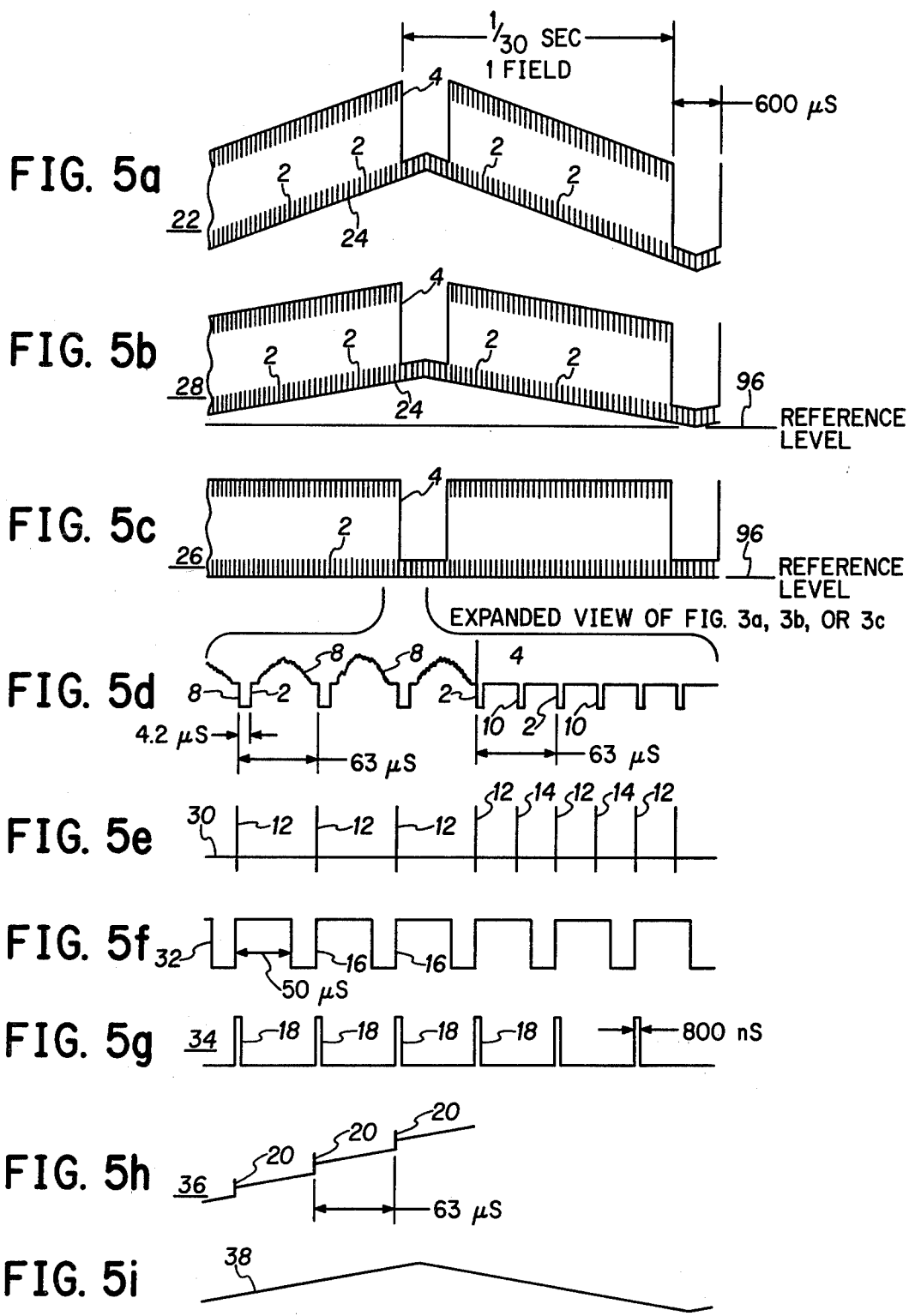
FIGS. 5a through 5i are waveform diagrams showing the operation of the functional blocks of FIG. 4.

Referring to FIG. 4, the input signal that is present on the input of the difference amplifier 87 is the signal represented in FIG. 5a by waveform 22. The composite video signal 22 is imposed upon a triangular waveform 24. Periodically, along the base of the waveform, there is a plurality of synchronization pulses 2. Waveform 22 of FIG. 5a is applied to difference amplifier 87, the output of which can be represented by the waveform 28 of FIG. 5b. There is still present the synchronization pulses 2, however, the triangular waveform 24 of FIG. 5b is substantially less in amplitude than that shown in FIG. 5a.

The output of difference amplifier 87 is carried by conductor 91 to clamping amplifier 93, the output of which is represented by waveform 26 of FIG. 5c. It should be noted at this point that substantially all of the low frequency noise has been removed leaving only the desired composite video signal.

Referring to FIG. 5d which is a time expanded view of FIGS. 5a, 5b or 5c, we see that the waveform of the three figures has a video picture signal 8 that is separated by the synchronization pulses 2. However, during the blanking pulse which is shown at 4 of FIGS. 5a, 5b and 5c, the periods between synchronization pulses are decreased by 50% due to the addition of equalization pulses 10 which are only present during the blanking pulse 4.

Waveform 28 of FIG. 5b is carried by conductor 125 to the sample and hold circuit 129 and to sync separator 131 by conductor 127. The output of the sync separator is represented by waveform 30 of FIG. 5e in which there are a plurality of sync pulses 12 that are normally separated by 63 microseconds and during the period of time in which the blanking pulses are present, there is also a equalization pulse 14. The waveform 30 of FIG. 5e is conducted to the pulse shaper by means of conductor 134.

Pulse shaper 135 sums waveform 30 with waveform 32 of FIG. 5f. Waveform 32 is a blanking waveform and its primary function is to blank out the undesirable equalization pulse 14. After additional circuitry handling, the 800 nanosecond pulses 18 of waveform 34, as shown in FIG. 5e, are presented on conductor 137 for control of the feed forward switch 139 and the same waveform is used to control the sample and hold switch 129.

The sample and hold switch samples waveform 28 upon the occurrence of every sample pulse 18 shown in waveform 34 of FIG. 5g. Waveform 36 of FIG. 5h is the output of the sample and hold device 129 and has undesirable glitches 20 that are a consequence of the sampling operation. Conductor 89 joins the sample and hold device 129 to low-pass filter means 130 which removes the undesirable glitches 20 from the waveform 36. The output of the low-pass filter means 130 is present on conductor 92 and is represented by waveform 38 of FIG. 5i. Waveform 38 is a low frequency triangular waveform that is passed through difference amplifier 87. Difference amplifier 87 subtracts waveform 38 from waveform 22 of FIG. 5a and provides waveform 28 of FIG. 5b on conductor 91.

The feed forward switch 139 switches waveform 28 of FIG. 5d to reference level 96 at the occurrence of each of the command pulses 18 of FIG. 5g. Waveform 26 of FIG. 5c represents the composite video that is imposed on a reference level 96 which has essentially all of the low frequency noise removed and is the output from clamp amplifier 93.

The output of the clamp amplifier is carried by conductor 95 to the output amplifier 97 which is used to drive an external filter, not shown in FIG. 4. There is a video signal that has had the audio components stripped by means of the external filter after being amplified by amplifier 109.

DETAILED DESCRIPTION OF THE CLAMP CIRCUITRY

Figure 6:
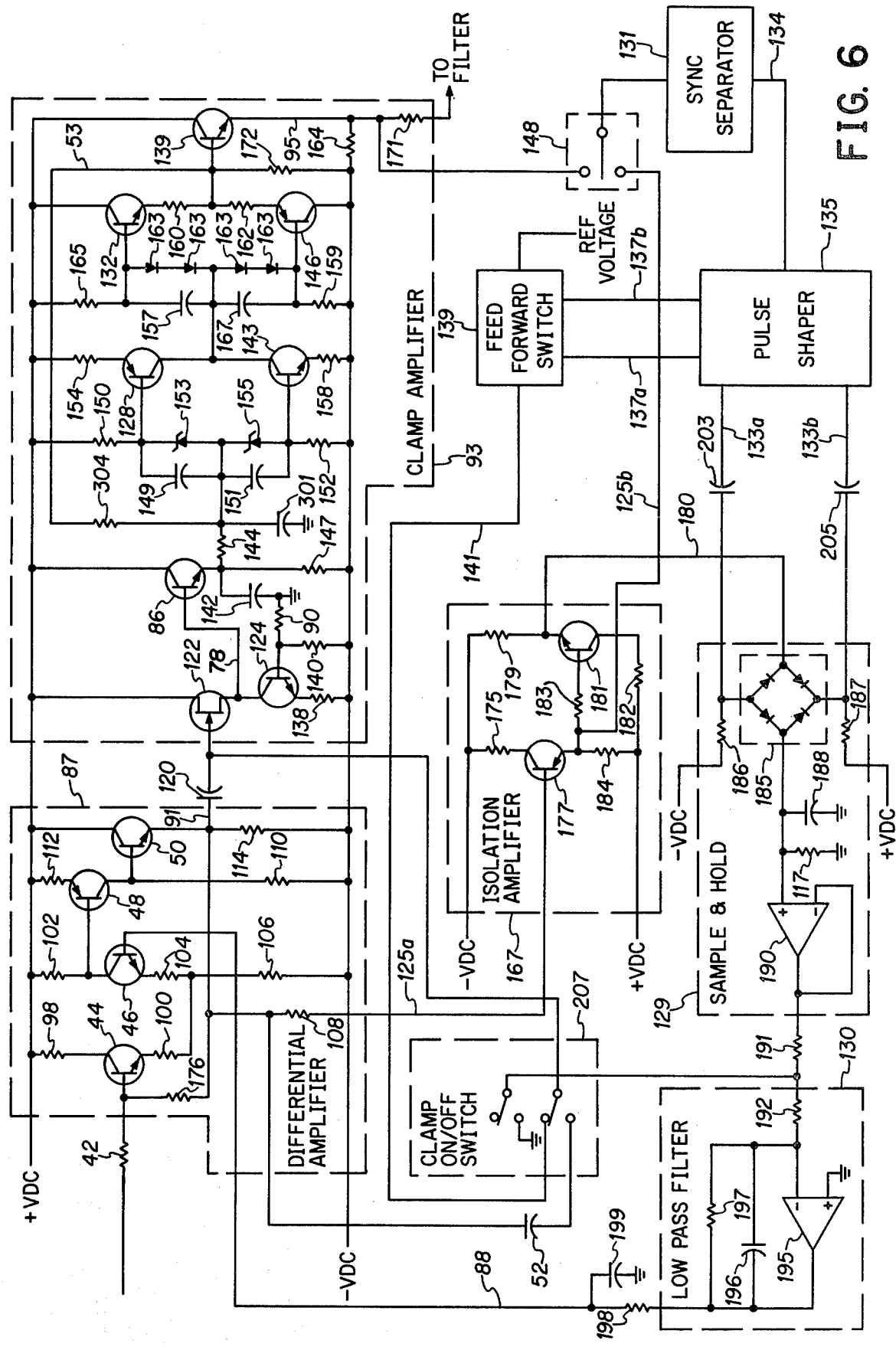
FIG. 6 is a schematic diagram of the invention.

Referring to FIG. 6, the input is coupled to the difference amplifier 87 by means of resistor 42. The difference amplifier 87 consists of transistors 44 and 46 that, in conjunction with resistors 98, 100, 102, 104 and 106, are wired in a differential amplifier configuration. Transistors 48 and 50 provide additional gain and level adjustments of the difference output that is present on the base of transistors 48. The gain of the transistor 48 is established by resistors 110 and 112. The current through transistor 50 is limited by resistor 114. Feedback resistor 176 established the overall gain of the difference amplifier 87.

The output of the amplifier 87 is present on conductors 91 and 125 as was shown in the block diagrams of FIGS. 3 and 4. Conductor 91 is connected to capacitor 120 which is the coupling capacitor that couples the output of the difference amplifier into the clamp amplifier 93. This capacitor, in conjunction with the high input impedance of the FET transistor 122 that is also in parallel with the high input impedance provided by the feed forward switch 139, allows the signal to be coupled across the capacitor 120 and isolates the output of the difference amplifier 87 from the operation of the feed forward switch 139. The time constant of the circuit prevents, after the passing of the pulse that is represented by the pulses 18 shown in waveform 34 of FIG. 5g, the signal level from rapidly changing from the reference level.

The clamp amplifier 93 consists of a high input impedance. as was discussed earlier, provided by the field effect transistor 122. The dain to source current is controlled by transistor 124 which is biased by resistors 90, 138 and 140. The source output of field effect transistor 122 is conducted by conductor 78 to the base of transistor 86 which is an emitter follower that is biased by resistor 147. Filtering is provided by capacitor 142. Additional gain of the clamp amplifier is provided by the circuitry that includes transistors 128, 143, 132, 146 and 139. Resistor 144 connects the output of the drain of transistor 122 to a circuitry that established the DC level for the inputs to transistors 128 and 143 which includes capacitors 149, 151 and zener diodes 153 and 155 and resistors 150 and 152. Frequency compensation is provided by the capacitor 301.

Current limiting and biasing for transistors 128, 143, 132 and 146 is provided by resistors 154, 158, 165 and 159. The output of transistors 128 and 143 that is present on their collectors is coupled to a second DC reference coupling circuit that includes four diodes 163 that are connected to series capacitors 157 and 167, which are biased by bias resistors 159 and 165. The four diodes 163 shown provide a DC reference to each transistor's base at 1.2 volts. Transistors 132 and 146 provide current gain with transistor 139 providing impedance matching. Transistor 139 is biased by resistor 172 and the output current is limited by resistor 171.

There is a feedback resistor 304 that connects resistor 144 to the output present upon conductor 53 and used to establish the overall gain of the circuitry.

The output of the difference amplifier 87 is present on conductor 125a and is passed through a current limiting resistor 108 to isolation amplifier 167 that includes transistors 177 and 181 which are wired as emitter followers. Resistors 175 and 184, in conjunction with resistor 108, establish the gain of the amplifier while providing current limiting capabilities. In addition resistor 183 couples the emitter output from transistor 177 to the base of transistor 181, whose current is limited by resistors 179 and 182. As was stated before, the circuitry associated with transistors 177 and 181 provides additional isolation and impedance matching for the output of the difference amplifier 87. The emitter of transistor 181 is joined to a bridge type diode switch means 185, which is part of the sample and hold circuitry 129, by means of conductor 180.

The diode switch means 185 is biased off by means of resistors 186 and 187, which are connected to a voltage source (not shown). However, when there is present the sampling command pulses as represented by FIG. 5g, waveform 34, on conductors 133a and 133b, in complementary form, the diode switch means 185 is turned on. The pulses are coupled across capacitors 203 and 205 and will cause the diode switch means 185 to turn on, thereby transferring the signal that is present on conductor 180 to storage capacitor 188. Amplifier 190 is a voltage follower amplifier and offers a high input impedance in conjunction with resistor 117 to the signal that is stored in storage capacitor 188.

The amplifier 190 provides drive capabilities for driving the low-pass filter means 130 and is coupled to the low-pass filter means 130 by resistors 191 and 192. The low-pass filter means 130 consists of an amplifier 195 which has a feedback loop that includes capacitor 196 and resistor 197. The output of the low-pass filter means is further filtered by capacitor 199 and resistor 198. The output is coupled into the input of transistor 46 by means of conductor 88 and should resemble the signal shown by waveform 38 of FIG. 5i.

Switch means 207 provides the capability of bypassing the clamp circuit by coupling the output signal from the emitter of transistor 50 to the gate of the field effect transistor 122 through capacitor 52. Switch means 207 also grounds the junction of resistors 191 and 192 thereby providing a constant input to low-pass filter means 130.

There are presented two embodiments of the sync separator 131 and the pulse shaper 135 as well as the feed forward switch 139. Switch 148 is used for explanatory purposes only and in one position provides for coupling the output of the clamp amplifier 93 to the sync separator 131 of FIG. 10. When the video clamp is operated in the real time mode or in the other position, the switch 148 will couple the output of the difference amplifier 87 to the sync separator 131 of FIG. 7.

Figure 7:
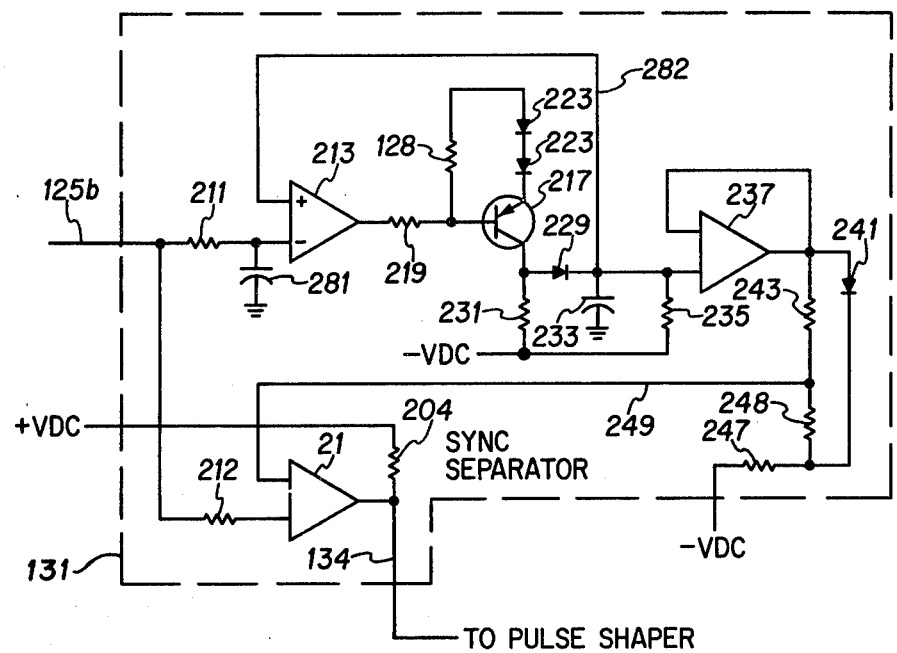
FIG. 7 is a schematic diagram of the sync separator.

Referring to FIG. 7, a first embodiment of the sync separator 131, conductor 125b connects the emitter of transistor 177 of FIG. 6 to resistors 211 and 212. Resistor 211 is connected to the input of amplifier 213 and it limits the current to the amplifier 213. Capacitor 281 provides filtering for amplifier 213. The output of the amplifier 213 is connected by way of resistor 219 to the base of transistor 217. Transistor 217 boosts the gain of the amplifier 215 and its associated circuitry consists of biasing resistors 128 and 231 as well as diodes 223 and, which together form a bias of 1.2 volts. The collector of transistor 217 is coupled by diode 229 into amplifier 237 which is wired as a voltage follower to the input of amplifier 213 by conductor 282. Filtering is provided by capacitor 233 and biasing by resistor 235. The output of the amplifier 237 is biaed to a −DC volts by means or resistors 247, 248 and diode 241. Resistor 243 limits the current flowing through conductor 249 which joins the output of amplifier 237 to the difference amplifier 21 of FIG. 7. Difference amplifier 21 of FIG. 7 compares the difference of the signals that are present on conductor 249 and resistor 212 and provides the difference signal on conductor 134 that is biased by resistor 204 and the +DC voltage. The difference signal shown by waveform 30 of FIG. 5e is coupled to the pulse shaper 135 by conductor 134.

Figure 8:
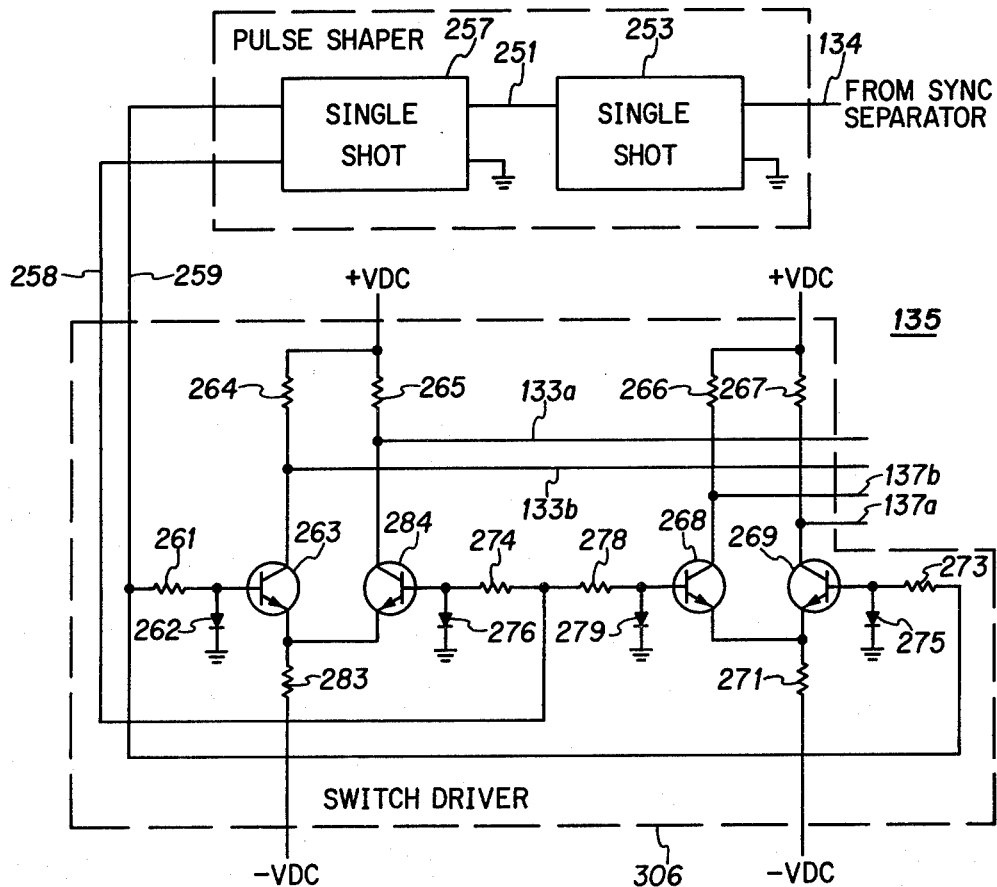
FIG. 8 is a schematic diagram of the pulse shaper.

FIG. 8 is a schematic diagram of one embodiment of a pulse shaper 135 and consists of two one-shots 253 and 257 and a switch driver section 306.

The difference signal on conductor 134 is used to trigger the one-shot multivibrator 253. The timing of the pulse that is provided by multivibrator 253 is approximately 50 microseconds, the output of which appears on conductor 251 and is shown by waveform 32 of FIG. 5f, this in turn turns on one-shot 257 whose output is set to provide complementary pulses having a pulse width of approximately 800 nanoseconds. The output of the one-shot 257 appears on the conductor 259 which is the positive going pulse and on conductor 258, which is the negative going pulse.

The positive going pulse that is present on conductor 259 forward biases the transistor switch 263 and the transistor switch 269 causing these switches to provide a negative going pulse on their collectors. The output of transistor 263 is connected to conductor 133b which will forward bias the diode bridge 185 of FIG. 6. In a similar manner, transistor switch 284 will turn off for the duration of the pulse that is provided on conductor 258 causing a positive going pulse to be coupled across capacitor 203 from transistor 284 which is connected to capacitor 203 by conductor 133b, thereby forward biasing of the other side of the diode bridge 185 which allows the passage of the signal that is present on conductor 180 through the diode bridge 185 and to capacitor 188.

The circuit configuration of the switches 263 and 284 include a current limiting resistor 261 which is in the base of the transistor switch 263 with biasing being established by a diode 262. The collector current is limited through the transistor switch 263 by resistor 264 and resistor 283, which also limits the current through transistor 284 in conjunction with the resistor 265. The base current of transistor 284 is limited by resistor 274 and the base bias is established by diode 276.

The switching arrangement for the feed forward switch 139 is provided by the switching circuits 268 and 269 which operate in identical fashion to the transistor circuits of 263 and 284. The bias and base current of transistor 269 is established by resistor 273 and diode 275 and for transistor 268, the base current limiting and bias is provided by resistor 278 and diode 279. The collector current is limited by resistors 266 and 267 with both transistors having a common emitter current limiting resistor 271.

Figure 9:
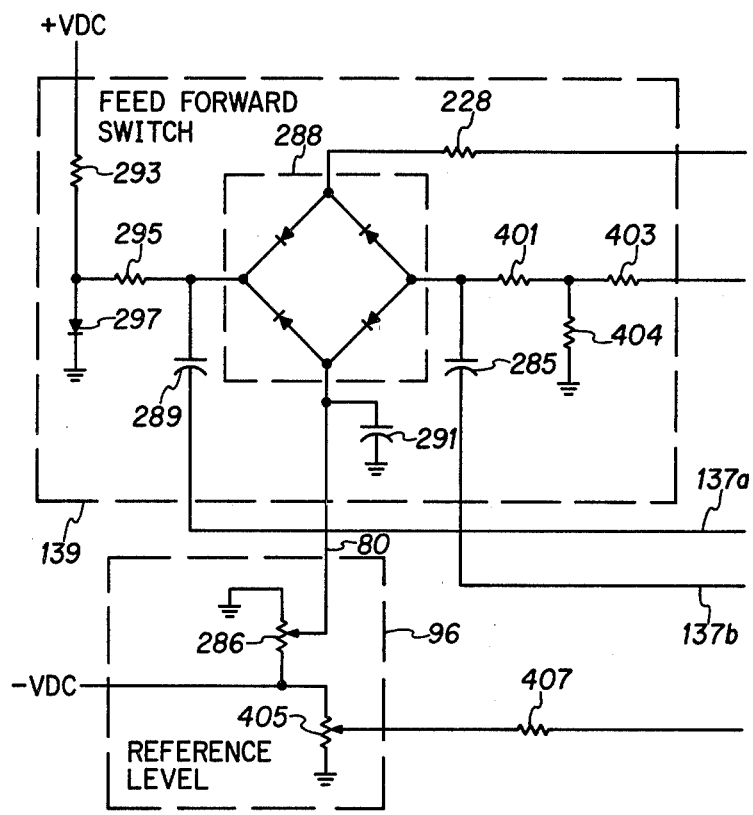
FIG. 9 is a schematic diagram of the feed forward clamp.

During the time transistor switch 269 is off, and transistor switch 268 is on, there is positive going pulse on conductor 137a and a negative going pulse on conductor 173b. These pulses are coupled to the feed forward switch 139 of FIG. 9, to which reference should now be made, and are coupled across the capacitors 285 and 289 forward biasing the feed forward switch 139 which includes a diode bridge 288. When the diode bridge 288 is biased on during the command pulses, the reference level 96 that is present on conductor 80 is coupled through the switch 207 of FIG. 6 to conductor 141 which pulls the gate of the field effect transistor 122 to the reference level. Current limiting is provided by resistor 228 of FIG. 9. After the one-shot 257 of FIG. 7 resets, the transistor switch 268 goes on, transistor switch 269 goes off, and the diode bridge 288 offers a high input impedance in parallel with the input impedance of the field effect transistor 122.

Referring back to FIG. 9, the reference level is established by the potentiometer 286 which is adjustable and filtering is provided by capacitor 291. The positive bias for the diode bridge is established by resistors 293 and 295 in conjunction with diode 297 and the negative biasing for the bridge is established by resistors 401, 403 and 404.

The clamp on/off switch 207 of FIG. 6 provides several functions. Essentially, it will, when off, provide a constant bias to the clamp amplifier 93 by switching the conductor 141 from the diode bridge 288 to a constant reference level that is established by potentiometer 405 and resistor 407 of FIG. 9. In addition, it will, as discussed earlier, connect the input of the low-pass filter means 130 to ground level and also, the output of the difference amplifier 87, after passing through capacitor 52, is placed at the same reference level as the gate to the field effect transistor 122. In other words, any AC noise that is present on the output of the difference amplifier 87 is coupled to both sides of the capacitor 120 and is slowly discharged through resistor 407 to the reference level established by potentiometer 405.

Figure 10:
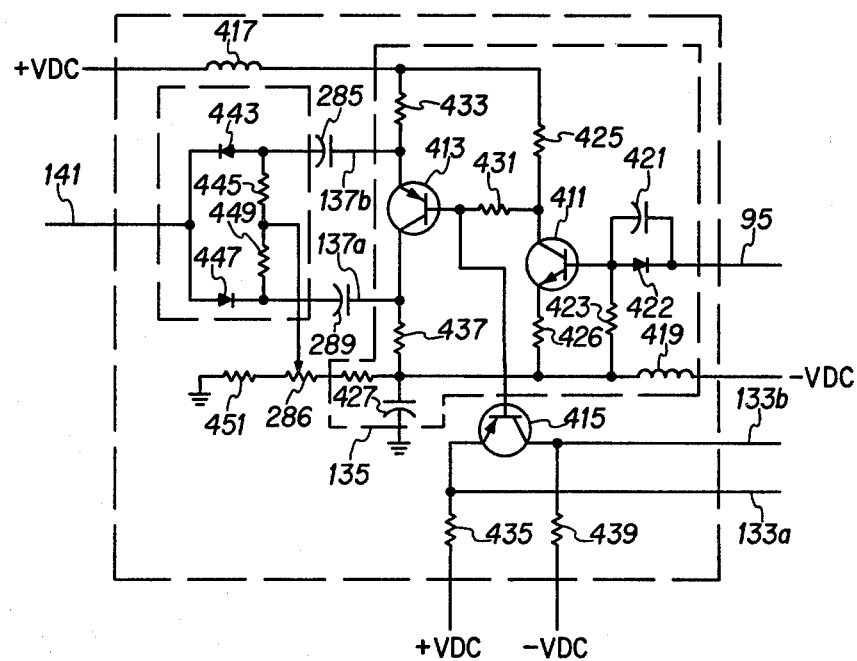
FIG. 10 is a schematic diagram of a real time pulse shaper and sync separator.

In the situation where it is desirable to use a real time pulse, rather than the regeneration of a pulse, there is provided another embodiment of the invention in FIG. 10, in which the output of the clamp amplifier 93 is coupled by conductor 95 through switch 148 to the pulse shaper 135 of FIG. 10, which is comprised of transistor circuits that include transistors 411, 413 and 415. The video signal is coupled to transistor 411 by means of capacitor 421. Transistor 411 is turned off by a positive pulse exceeding the offset voltage established by diode 422. Resistor 423 establishes the base bias for the transistor 411. The collector to emitter current is limited by inductors 417 and 419, and resistors 425 and 426. The output of transistor 411 is coupled to transistor 413 by means of resistor 431 which upon the occurrence of a negative going pulse on its base will turn on, providing a pulse that is coupled across capacitor 285. The negative pulse will reverse bias diode 443. The output of the collector of transistor 413 is applied to conductor 133a and is coupled across the capacitor 289 forward biasing diode 447, allowing the reference that is established by resistors 286 and 451 to be coupled through resistor 449 and diode 445 to the base of the field effect transistor 122 after being passed through the clamp on/off switch 207. Thus the reference level will be present on the gate of the transistor 122.

In a similar manner, transistor 415 will provide a pulse on conductors 133a and 133b which are coupled across capacitors 203 and 205 of FIG. 6, which in turn will bias the diode bridge 185 providing the feedback which operates as was discussed previously.

There is present filter capacitor 427 for the removal of noise. Resistors 435 and 439 are emitter to collector current limiting resistors which limit the current flow through transistor 415 while resistors 433 and 437, in conjunction with resistor 431, bias transistor 413 and limits the collector to emitter current. Resistors 445 and 449 bias diodes 443 and 447 off when under normal non-pulse conditions.

The circuitry of FIGS. 6 and 7 was built to remove the hum on the composite video signal. The synchronization tips were clamped at a fixed DC level to obtain a greater than 50 dB low noise or hum reduction through the use of two filter loops. The first filter loop as was disclosed utilizes a feedback sample and hold circuit to reduce the low frequency noise by more than 22 dB. The second loop has a clamping circuit, and it further reduces the low frequency noise by more than 32 dB. The sample and hold feedback loop must precede the clamp loop since it involves the sampling of the video signal at sync times to develop an error voltage. If the clamping loop preceded the feedback loop, the sample error would be zero and, as such, the sample and hold filter loop would contribute negligible clamping.

Many changes and modifications in the above-described embodiments of the invention can, of course, be carried out without departing from the scope thereof. Accordingly, the invention is intended to be limited only by the scope of the appended claims.

What is claimed is:

1. A video clamp means, comprising:
   an input amplifier for obtaining a difference signal that is the algebraic difference between an input signal having periodically spaced synchronization pulses of a fixed synchronization period and a reference signal; and
   means for generating a sampling command signal from the difference signal during the synchronization periods; and
   means for sampling the difference signal upon the occurrence of each sampling command signal whereby the means for sampling the difference signal will generate the reference signal by taking a sample of the difference signal and hold the sample on its output until a subsequent occurrence of the sampling command signal.

2. The video clamp means according to claim 1, further comprises:
   clamp amplifier;
   a controllable switch connected to and controlled by the sampling command signal;
   means for applying a second reference signal level to the controllable switch means; and
   coupling means for coupling the difference signal to the controllable switch means and the clamp amplifier from the output of the amplifier whereby upon each occurrence of the sampling command signal the controllable switch means causes the second reference signal level to be present on both sides of the controllable switch means and on the input of the clamp amplifier.

3. The video clamp according to claims 1 or 2 wherein the means for sampling the difference signal further comprises:
   switch means operable upon the occurrence of the sampling command signal;
   storage capacitor means connected between the output of the switch means and a reference point; and
   low-pass filter connected to the switch means for removing high frequency noise from the reference signal.

4. The video clamp means according to claims 1 or 2 wherein the means for generating the sampling command signal further comprises:
   first circuit means for removing the synchronization pulses from the difference signal; and
   second circuit means for converting the synchronization pulses into the sampling command signal having a predetermined period and a fixed duration.

5. The video clamp means according to claim 4 wherein the first circuit means for removing the synchronization pulses from the difference signal further comprises:
   means for filtering out the synchronization pulses to provide an output signal that is representative of the difference signal with the synchronization pulses removed; and
   means for algebraically summing of the difference signal with the output of the amplifier and filter means.

6. The video clamp means according to claim 4 wherein the second circuit means for converting the synchronization pulses into the sampling command signal having a predetermined period and duration, further comprises:
   first single-shot multivibrator wired to provide a first output pulse having a first predetermined period triggered by the sampling command signal;
   second single-shot multivibrator triggered by the first output pulse to provide a second output pulse having a second predetermined period; and
   means for preventing the second single shot multivibrator from providing a subsequent second pulse until the first output pulse has timed out and the first single shot multivibrator has returned to initial stage and then has been reinitialized by a pulse of the sampling command signal.

7. The video clamp means according to claim 4 wherein said second circuit further comprises:

a first switch driver means connected to the means for sampling the difference signal; and a second switch driver means connected to the controllable switch.

8. The video clamp means according to claim 4 wherein the means for generating the sampling command signal further comprises:

a first switch means having a bias arrangement such that said first transistor switch means is normally nonconductive;

coupling means coupling the output of said clamp amplifier to said first switch means wherein said first switch means is turned on by the coupling means passing the synchronization pulses to said first switch means while preventing other transitions of the output of the clamp amplifier means from affecting the first transistor switch means;

second switch means connected to the collector of the first switch means and providing drive capabilities for said sample and hold circuit; and third switch means connected to the collector of said first switch means providing on its output the drive pulses for the controllable switch.

9. The method of removing a low frequency noise from a wideband signal having periodically spaced synchronization pulses of a fixed synchronization period comprising:

obtaining the difference between the input signal and a reference signal;

generating a sampling command signal from the difference signal during the synchronization period;

sampling the difference signal during the synchronization periods;

holding the sampled difference signal when not sampling the difference signal;

passing the sampled difference signal through a low-pass filter means; and using the output of the low-pass filter means as a reference to obtain the algebraic difference between the wideband signal and the output of the low-pass filter means.

10. The method according to claim 9 further comprising:

switching the difference signal to a predetermined level during the synchronization period.

* * * * *

UNITED STATES PATENT AND TRADEMARK OFFICE
CERTIFICATE OF CORRECTION

PATENT NO. : 4,218,706
DATED : August 19, 1980
INVENTOR(S) : Bill W. Brinegar and John W. Haines It is certified that error appears in the above-identified patent and that said Letters Patent are hereby corrected as shown below:

Column 7, line 28, following "223" delete "and,";

Signed and Sealed this

Twenty-first Day of April 1981

[SEAL]

Attest:

RENE D. TEGTMEYER

Attesting Officer    Acting Commissioner of Patents and Trademarks